(12) United States Patent
Kim et al.

(10) Patent No.: US 10,753,602 B2
(45) Date of Patent: Aug. 25, 2020

(54) INFLUENCE ANALYZING APPARATUS FOR ANALYZING INFLUENCE OF COMBUSTIBLES

(71) Applicant: DOOSAN HEAVY INDUSTRIES & CONSTRUCTION CO., LTD., Changwon-si, Gyeongsangnam-do (KR)

(72) Inventors: Seongjoon Kim, Seoul (KR); Byungil Jung, Seoul (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 465 days.

(21) Appl. No.: 15/700,953

(22) Filed: Sep. 11, 2017

(65) Prior Publication Data
US 2018/0073724 A1   Mar. 15, 2018

(30) Foreign Application Priority Data
Sep. 12, 2016  (KR) ........................ 10-2016-0117377

(51) Int. Cl.
  *F22B 37/38*  (2006.01)
  *G01N 27/416*  (2006.01)
  (Continued)

(52) U.S. Cl.
  CPC ............ *F22B 37/38* (2013.01); *F01K 13/003* (2013.01); *F22B 1/282* (2013.01); *F22B 35/00* (2013.01);
  (Continued)

(58) Field of Classification Search
  CPC .......... F22B 37/38; F22B 35/00; F22B 1/282; F01K 13/003; F23N 1/00; F23N 2221/10;
  (Continued)

(56) References Cited

U.S. PATENT DOCUMENTS 5,764,535 A  *  6/1998  Okazaki ................. F22B 35/18
                                                              700/274
6,206,685 B1 *  3/2001  Zamansky ............. B01D 53/56
                                                              110/210
(Continued)

FOREIGN PATENT DOCUMENTS

JP        07-20282 A      8/1995
KR    10-0370348 B1       1/2003
(Continued)

OTHER PUBLICATIONS

European Search Report.
(Continued)

*Primary Examiner* — Mohammad K Islam
(74) *Attorney, Agent, or Firm* — INVENSTONE Patent, LLC (57) ABSTRACT

A apparatus may extract temperature for each region of a feed water and steam system of a thermoelectric power plant with respect to a combustible combination including one or more combustibles, extract one or more vectors for each region from the temperatures extracted for each region, generate one or more combustible clusters, each cluster including one or more combustible combinations having similar properties from the extracted vectors, and extract a characteristic component of a combustible combination that increases or decreases a boiler performance index from among one or more combustible combinations included in the one or more combustible clusters.

12 Claims, 4 Drawing Sheets

(51) Int. Cl.
*F22B 1/28* (2006.01)
*F23N 1/00* (2006.01)
*F22B 35/00* (2006.01)
*F01K 13/00* (2006.01)
*F22D 1/00* (2006.01)

(52) U.S. Cl.
CPC ........... *F23N 1/00* (2013.01); *G01N 27/4163* (2013.01); *C01B 2203/16* (2013.01); *F22D 1/003* (2013.01); *F23N 2221/10* (2020.01)

(58) Field of Classification Search
CPC .... G01N 27/4163; G01N 25/22; G01N 25/38; G01N 25/32; G01N 25/24; F22D 1/003; C01B 2203/16; G05D 23/20; G01D 21/02
See application file for complete search history.

(56) References Cited

U.S. PATENT DOCUMENTS

| | | | | |
|---|---|---|---|---|
| 6,371,147 | B1* | 4/2002 | Philippe | G01F 1/6965 137/487.5 |
| 6,389,330 | B1* | 5/2002 | Khesin | F23N 5/003 431/14 |
| 8,931,950 | B2 | 1/2015 | King | G01K 17/006 374/121 |
| 9,213,998 | B2* | 12/2015 | Besore | G06Q 50/06 |
| 2002/0081468 | A1* | 6/2002 | Shioya | H01M 8/04 429/420 |
| 2002/0106540 | A1* | 8/2002 | Shioya | C01B 3/323 429/410 |
| 2002/0179493 | A1* | 12/2002 | Etter | C10B 55/00 208/131 |
| 2003/0066638 | A1* | 4/2003 | Qu | F24S 10/90 165/186 |
| 2003/0121905 | A1* | 7/2003 | Nanno | G05B 11/42 219/494 |
| 2004/0013987 | A1* | 1/2004 | O'Rear | C10L 3/00 431/2 |
| 2006/0015298 | A1 | 1/2006 | Daw et al. | |
| 2006/0075682 | A1* | 4/2006 | Bullinger | C10L 9/08 44/626 |
| 2006/0178762 | A1* | 8/2006 | Wroblewski | G05B 13/027 700/30 |
| 2008/0015826 | A1* | 1/2008 | Ealet | G05B 13/026 703/2 |
| 2009/0084422 | A1* | 4/2009 | Haass | C01B 19/002 136/204 |
| 2009/0188243 | A1* | 7/2009 | Williams | F01N 3/023 60/295 |
| 2009/0274985 | A1* | 11/2009 | McKnight | F23C 6/045 431/36 |
| 2010/0047139 | A1* | 2/2010 | Brantley | B01B 1/005 422/600 |
| 2011/0011315 | A1* | 1/2011 | Hayashi | F23C 9/003 110/345 |
| 2011/0126824 | A1* | 6/2011 | Conlon | F22B 1/006 126/601 |
| 2012/0013472 | A1* | 1/2012 | Taylor | G01N 33/222 340/632 |
| 2012/0064472 | A1* | 3/2012 | Yoshii | F27B 17/0025 432/42 |
| 2012/0107751 | A1 | 5/2012 | Akiyama et al. | |
| 2012/0111027 | A1* | 5/2012 | Campbell | F25B 21/02 62/3.3 |
| 2013/0125841 | A1* | 5/2013 | Ichihara | F22D 1/02 122/420 |
| 2014/0060086 | A1* | 3/2014 | Ranalli | B60H 1/00478 62/3.3 |
| 2014/0123624 | A1 | 5/2014 | Minto | |
| 2014/0172370 | A1 | 6/2014 | Li et al. | |
| 2014/0316737 | A1* | 10/2014 | Wang | F22B 35/18 702/130 |
| 2016/0010878 | A1* | 1/2016 | Lee | F24D 19/1051 700/300 |
| 2016/0085783 | A1 | 3/2016 | Cevahir et al. | |
| 2016/0091197 | A1* | 3/2016 | Nagano | F23J 15/02 122/441 |
| 2017/0022898 | A1* | 1/2017 | Beadie | F02C 3/20 |
| 2017/0363015 | A1* | 12/2017 | Minto | F02C 3/30 |

FOREIGN PATENT DOCUMENTS

| | | |
|---|---|---|
| KR | 1020060087868 B1 | 3/2007 |
| KR | 1020130078714 B1 | 10/2014 |
| KR | 1014937820000 B1 | 2/2015 |
| KR | 1020150066865 A | 6/2015 |
| KR | 1020160036163 A | 4/2016 |
| WO | 2004107246 A | 12/2004 |

OTHER PUBLICATIONS

Korean Office Action issued by the Korean Patent Office dated May 23, 2017 in connection with Korean Patent Application No. 10-2016-0117377.

A Korean Notice of Allowance issued by the Korean Intellectual Property Office dated Oct. 17, 2017 in connection with Korean patent application No. 10-2016-0117377.

\* cited by examiner

| Cluster | EXIT TEMPERATURE | HEAT ABSORPTION RATE OF FURNACE ($\Delta T \times Flow/min$) |
|---|---|---|
| 1 | 370.61 | 921.46 |
| 2 | 365.54 | 944.56 |
| 3 | 371.34 | 986.72 |
| 4 | 374.11 | 961.73 |
| 5 | 376.22 | 937.95 |
| 6 | 378.69 | 941.64 |
| 7 | 378.22 | 961.81 |
| 8 | 361.46 | 952.01 |
| 9 | 361.79 | 1030.05 |
| 10 | 371.45 | 986.49 |

INFLUENCE ANALYZING APPARATUS FOR ANALYZING INFLUENCE OF COMBUSTIBLES

CROSS REFERENCE TO RELATED APPLICATION

The present application claims priority to Korean Patent Application No. 10-2016-0117377, filed Sep. 12, 2016, the entire contents of which is incorporated herein by reference.

BACKGROUND

Conventionally, it was impossible to determine a relationship between a boiler performance index or a furnace heat absorption rate and each characteristic component of a mixed coal. Even determined, it was impossible to reflect the design structural characteristics of a boiler provided in a thermoelectric power plant on determination of a relationship between a boiler performance index or a furnace heat absorption rate and each characteristic component of mixed coal.

Therefore, conventionally, influence of a mixed coal can be predicted and evaluated only by creating a combustibility index obtained using a calculation equation based on physical properties of the mixed coal without considering and reflecting structural characteristics of a thermoelectric power plant.

BRIEF SUMMARY

One object of the present disclosure is to provide an influence analyzing apparatus that extracts a boiler performance index and a furnace heat absorption rate for each combustible cluster including one or more mixed coals having similar properties and calculate influence of each characteristic component of a mixed coal on the boiler performance index and the furnace heat absorption rate.

According to one aspect, there is provided an influence analyzing apparatus including: a temperature extraction unit extracting temperatures of respective regions in a feed water and steam system of a thermoelectric power plant in which a combustible combination including one or more combustibles is combusted; a vector extraction unit extracting one or more vectors for each region from the temperatures of the respective regions; a cluster generation unit generating one or more combustible clusters, each cluster including one or more combustible combinations having similar properties, on the basis of the extracted vectors; and a characteristic component extraction unit extracting a characteristic component of a combustible combination that increases or decreases a boiler performance index from the one or more combustible combinations included in the one or more combustible clusters.

In another aspect, each region of the feed water and steam system may include at least one of a feed water heater, an economizer, a furnace, a super heater, and a reheater.

In a further aspect, the temperature extraction unit may extract temperatures for each region at a predetermined time interval.

In a yet further aspect, the vector extraction unit may extract the one or more vectors by performing functional principal component analysis with respect to the temperatures extracted for the respective regions.

In a yet further aspect, the vector extraction unit may calculate a smoothing function based on a basis function, and calculate an average temperature of the temperatures of the respective regions of the feed water and steam system and a covariance at two different time points based on the calculated smoothing function.

In a yet further aspect, the vector extraction unit may calculate an eigen function and eigenvalues using the calculated covariance, and extracts the one or more vectors for each region for each combustible combination on the basis of the calculated eigen function, the calculated smoothing function, and the calculated average temperature of the temperatures of the respective regions of the feed water and steam system with respect to each of the one or more combustible combinations.

In a yet further aspect, the vector extraction unit may extract the eigen function by minimizing a variance of the calculated eigenvalues.

In a yet further aspect, the cluster generation unit may generate the one or more combustible clusters, each combustible cluster including one or more combustible combinations, through cluster analysis.

In a yet further aspect, the boiler performance index may include at least one of a boiler exit temperature and a furnace heat absorption rate.

In a yet further aspect, the apparatus may further include a characteristic component selection unit selecting one or more characteristic components from each characteristic component group when a correlation coefficient obtained through correlation analysis of two or more characteristic components included in the characteristic component groups is equal to or higher than a reference value.

In a yet further aspect, the apparatus may further include a characteristic component determination unit determining, by performing stepwise regression, a characteristic component influencing the boiler performance index, from among the selected one or more characteristic components.

In a yet further aspect, the apparatus may further include a relational expression calculation unit calculating using a random forest algorithm, a relational expression to determine a relationship between the selected one or more characteristic components and the boiler performance index.

DETAILED DESCRIPTION

The above-described aspects and other aspects will be made clear through embodiments described below with reference to the accompanying drawings. It should be noted that constituent elements of each embodiment can be variously combined unless otherwise defined or not being contradictory to each other. The present disclosure can be embodied in various forms and should not be construed to be limited to embodiments described herein.

Throughout the drawings, parts may be omitted to make the subject matter of the present disclosure clearer, and the same reference numerals will refer to the same or like parts. It will be further understood that the terms "comprise", "include", "have", etc. when used in the specification, specify the presence of stated features, integers, steps, operations, elements, components, and/or combinations of them but do not preclude the presence or addition of one or more other features, integers, steps, operations, elements, components, and/or combinations thereof.

In the present disclosure, the term 'unit' used herein includes a block that can change or add a plug-in to a hardware system or a software system. That is, the term 'unit' includes a hardware or software component performing specific functions. In addition, the term 'unit' used in the present disclosure includes a software component or a hardware component selected from the group consisting of a generator, an extractor, a selector, a determiner, a calculator, a processor, and a controller. The 'unit' can be configured as an addressable storage medium or to run one or more processors. Accordingly, the 'unit', for example, includes components, such as software components, object-oriented software components, class components, and task components, processors, functions, attributes, procedures, subroutines, segments of a program code, drivers, firmware, a microcode, circuits, data, databases, data structures, tables, arrays, and variables. Functions provided by components and 'units' may be combined into a smaller number of functions to be implemented by a smaller number of components and units or divided into a larger number of functions to be implemented by a larger number of components and 'units'.

Also, the components and the 'units' may be configured to run one or more CPU's included in a device or system, or may be components such as generators, extractors, selectors, determiners, or calculators.

The present disclosure relates to an influence analyzing apparatus. More particularly, the present disclosure relates to an influence analyzing apparatus for analyzing the influence of characteristics of mixed coals used in a thermoelectric power plant on a boiler performance index and a furnace heat absorption rate.

A boiler performance index and a furnace heat absorption rate may be extracted for each combustible cluster including one or more mixed coals having similar properties, thereby calculating the degree of influence of each characteristic component of a mixed coal on the boiler performance index and the furnace heat absorption.

Figure 1:
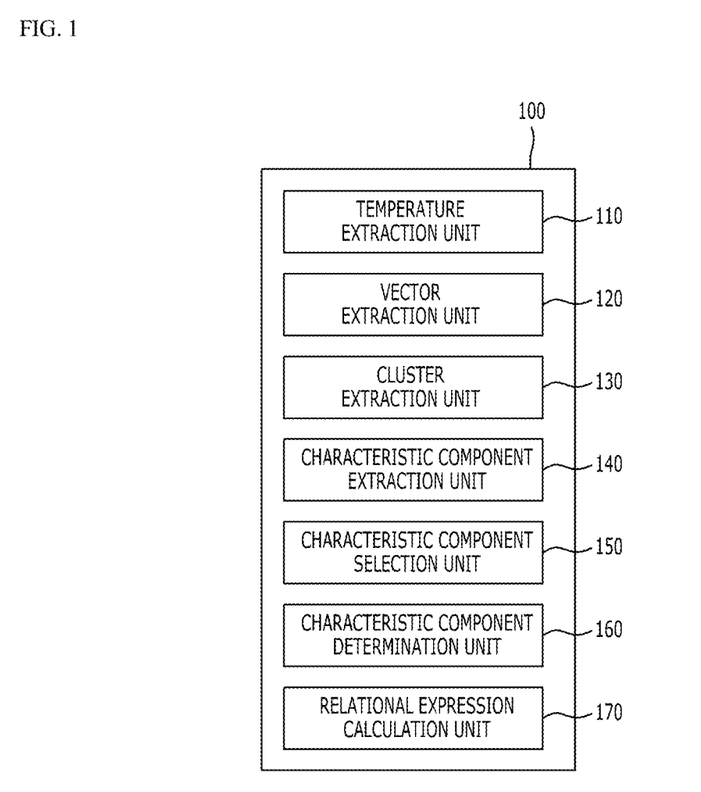
FIG. 1 is a block diagram illustrating the configuration of an influence analyzing apparatus for analyzing influence of each characteristic component of a combustible, according to one embodiment.

FIG. 1 is a block diagram illustrating the configuration of an influence analyzing apparatus 100 for analyzing influence of characteristic components of a combustible, according to one embodiment.

The influence analyzing apparatus according to one embodiment performs the following: extracting temperatures of respective regions in a feed water and steam system of a thermoelectric power plant in which each combustible combination including one or more combustibles is combusted; extracting one or more vectors for each region from the temperatures of the respective regions; creating one or more combustible clusters, each including one or more combustible combinations having similar properties; and extracting characteristic components that increase or decrease a boiler performance index from the one or more combustible combinations included in the one or more combustible clusters.

Specifically, the influence analyzing apparatus according to one embodiment includes a temperature extraction unit 110, a vector extraction unit 120, a cluster generation unit 130, and a characteristic component extraction unit 140.

According to one embodiment, the temperature extraction unit 110 extracts temperatures of respective regions in a feed water and steam system of a thermoelectric power plant in which each combustible combination including one or more combustibles is combusted.

The one or more combustibles may be coal. The combustible combination including one or more combustibles may be a mixed coal, but may not be limited thereto. The feed water supply and steam system of the thermoelectric power plant includes at least one of a feed water heater, an economizer, a furnace, a super heater, and a reheater. Each region of the feed water and steam of the thermoelectric power plant may be at least one of a feed water heater, an economizer, a furnace, a super heater, and a reheater.

The feed water heater is a region to primarily heat feed water to be supplied to a boiler using residual heat of steam, which remains after a turbine in a power plant is rotated. The economizer is a region to secondarily preheat the feed water that is preliminarily preheated by the feed water heater before the feed water is supplied to the boiler, and is a region disposed at the next stage of the boiler to recover heat from combustion exhaust gas.

The feed water that is finally preheated by the economizer is supplied to the boiler. The furnace heats the feed water using water walls formed along the wall surface thereof, thereby converting the feed water into steam. The furnace is a region connected to the super heater. The super heater is a region to further heat the steam having high temperature and high pressure, which is produced by the furnace, to generate heated steam, supply the heated steam to a high pressure turbine to rotate the turbine, and send steam discharged from the turbine to the regenerator.

The temperatures of the respective regions in the feed water and steam system of the thermoelectric power plant are temperatures measured at inlets or outlets of the regions. The temperature extraction unit 110 may be a temperature sensor located at the inlet or the outlet of each region. Alternatively, the temperature extraction unit 110 may be a computing device or a program executed in a computing device, the computing device receiving temperature information from the temperature sensors through cable communication or wireless communication.

In one embodiment, the vector extraction unit 120 extracts one or more vectors for each region from the temperatures of the respective regions. The temperatures extracted for each region may be temperatures obtained for each combustible combination. A combustion time for each combustible combination may vary. Accordingly, the temperature extraction unit 110 extracts the temperatures of the respective regions in which the combustion time varies depending on the combustible combination. The vector extraction unit 120 expresses the temperatures of the respective regions in the form of vectors having the same magnitude, thereby facilitating analysis.

In one embodiment, the cluster generation unit 130 generates one or more combustible clusters, each cluster including one or more combustible combinations having similar properties, from the extracted vectors. The cluster generation unit 130 generates one or more combustible clusters, each cluster including one or more combustible combinations (e.g. one or more mixed coals) having similar properties. The number of combustible clusters is one or more, and each combustible cluster includes a mixed coal or a plurality of mixed coals. Whether the mixed coals have similar properties or not is determined by examining how the boiler performance index is changed by the same amount of the mixed coals. The boiler performance index is an index directly measured or indirectly obtained from data of the boiler. The boiler performance index may include a boiler exit temperature and a furnace heat absorption rate. For example, when there are two mixed coals of the same amount, and when a difference between the boiler exit temperatures for the two mixed coals is 0.4° or less, the two mixed coals are considered to have similar properties.

In one embodiment, the characteristic component extraction unit 140 extracts a characteristic component of a combustible combination that raises or lowers the boiler exit temperature from one or more combustible combinations included in a combustible cluster. The characteristic component extraction unit 140 may extract a combustible cluster that exhibits a highest boiler exit temperature when combusted and a combustible cluster that exhibits a lowest boiler exit temperature when combusted.

The boiler included in the thermoelectric power plant changes water into steam, and the steam generated by the boiler rotates a turbine generator to generate electric energy.

The characteristic component extraction unit 140 determines the kind of coal that is mixed in the mixed coals belonging to the combustible cluster that exhibits the highest boiler exit temperature when combusted, and extracts the amounts of characteristic components of the coal that is determined to be mixed. Next, the characteristic component extraction unit 140 determines the kind of coal that is mixed in the mixed coals belonging to the combustible cluster that exhibits the lowest boiler exit temperature when combusted, and extracts the amounts of characteristic components of the coal determined to be mixed.

The characteristic component extraction unit 140 compares the amounts of characteristic components of the coal that is mixed in the mixed coals belonging to the combustible cluster that exhibits the highest boiler exit temperature and the amounts of characteristic components of the coal that is mixed in the mixed coals belonging to the combustible cluster that exhibits the lowest exit temperature, and extracts characteristic components that exhibit a difference value equal to or higher than a predetermined value between the compared amounts.

The characteristic component extraction unit 140 extracts a characteristic component that raises the boiler exit temperature by selecting, among the characteristic components having the difference value equal to or higher than the predetermined value, a characteristic component whose amount in the coal that is mixed in the mixed coals included in the combustible cluster that exhibits the highest boiler exhibit temperature is larger than that in the coal that is mixed in the mixed coals included in the combustible cluster that exhibits the lowest boiler exhibit temperature.

The characteristic component extraction unit 140 extracts a characteristic component that lowers the boiler exit temperature by selecting, among the characteristic components having the difference value equal to or higher than the predetermined value, a characteristic component whose amount in the coal mixed in the mixed coals included in the combustible cluster that exhibits the lowest boiler exit temperature is larger than the amount in the coal that is mixed in the mixed coals of the combustible cluster that exhibits the highest boiler exhibit temperature.

The characteristic components may include at least one of a caloric value (Kcal/kg), a total moisture content (%), a sulfur content (%), a hardgrove grindability index (HGI), a particle size (less than 2 mm %), an electrical resistivity, an ash fusion temperature (° C.), a melting point (° C.), inherent moisture (IM), a volatile matter, an ash component, fixed carbon, carbon (C), oxygen (O), hydrogen (H), nitrogen (N), sulfur (S), ash, $SiO_2$, $Al_2O_3$, $Fe_2O_3$, $CaO$, $MgO$, $Na_2O$, $K_2O$, $SO_4$, and $TiO_2$.

In one embodiment, each region of the feed water and steam system may be equipped with at least one of a feed water heater, an economizer, a furnace, a super heater, and a reheater. These are described above.

The temperature extraction unit 110 extracts temperatures of respective regions in the feed water and steam system at predetermined time intervals. The predetermined time interval may be 2 minutes. The temperature extraction unit 110 may extract the temperatures for each mixed coal.

In one embodiment, the vector extraction unit 120 extracts one or more vectors for each region by performing functional principal component analysis (PCA) on the extracted temperatures of the respective regions.

In one embodiment, the vector extraction unit 120 calculates a smoothing function on the basis of a basis function, and calculates the average temperature of the temperatures of the respective regions of the feed water and steam system and a covariance at two different time points for each combustible combination, on the basis of the calculated smoothing function.

The vector extraction unit 120 first calculates a smoothing function $x(\bullet)$ expressed as $y_{ij} = x(t_{ij}) + e_{ij}$ The smoothing function is obtained according to Equation 1. "i" is the number of regions and "j" is the number of time intervals when the temperature extraction unit 110 extracts the temperatures at time intervals.

$$x_i(t) = \sum_{k=1}^{K} c_{ik} \phi_k(t) \qquad \text{Equation 1}$$

$\phi_k(t)$ is a basis function and it may be any one of a polynomial expression, a Fourier function, a spline function, a wavelet function, and a B-spline function.

$\{c_{ik}\}_{k=1}^{K}$ is determined to satisfy Equation 2.

$$\min_{\{c_{ik}\}_{k=1}^{K}} \Sigma_{j=1}^{m} (y_{ij} - \Sigma_{k=1}^{K} c_{ik} \phi_k(t_{ij}))^2 \qquad \text{Equation 2}$$

For each combustible combination, the average temperature of the temperatures of all of the respective regions of the feed water and steam system is calculated according to Equation 3.

$$\bar{x}(t) = \frac{1}{n} \sum_{i=1}^{n} x_i(t) \qquad \text{Equation 3}$$

The covariance at two time points is calculated according to Equation 4.

$$\sum_x (s, t) = \frac{1}{n} \sum_{i=1}^{n} (x_i(s) - \bar{x}(s))(x_i(t) - \bar{x}(t)) \qquad \text{Equation 4}$$

"s" and "t" are time points that differ from each other.

In one embodiment, the vector extraction unit 120 calculates an eigen function and eigenvalues using the calculated covariance, and can extract vectors for each region for each combustible combination, on the basis of the eigen function, the smoothing function, and the average temperature of the feed water and steam system for each combustible combination.

In one embodiment, the vector extraction unit 120 extracts the eigen function by maximizing the covariance of the eigenvalues.

The eigen function is calculated by maximizing the variance of eigen values expressed as Equation 5.

$$Z_{ip} = \int \Sigma_x(s,t) \psi_{ip}(t) dt \qquad \text{Equation 5}$$

$Z_{ip}$ is eigenvalues. $\psi_{ip}(t)|p=1 \leq p \leq P$ is an eigen function. P is the number of vectors to be extracted.

The eigen function satisfies Equation 6 and Equation 7.

$$\int \psi_{ip}(t) \psi_{iq}(t) dt = 0 \text{ where } \{p,q | p \neq q, 1 \leq p, q \leq P\} \qquad \text{Equation 6}$$

$$\int \psi_{ip}(t)^2 dt = 1 \qquad \text{Equation 7}$$

The vectors for each region are calculated according to Equation 8.

$$f_{ip} = \int \psi_{ip}(t)(x_i(t) - \bar{x}(t)) dt \qquad \text{Equation 8}$$

P vectors are calculated according to Equation 8. For example, when the number of regions is 10 and when 5 vectors are calculated for each region, a total of 50 vectors are calculated for all the regions for each mixed coal.

In one embodiment, the cluster generation unit 130 generates one or more combustible clusters through cluster analysis. The cluster analysis may be k-means clustering, for example.

When the number of vectors extracted for each mixed coal is p and when the number of mixed coals analyzed is n, a matrix having a size of n*p is expressed as follows:

$$\begin{bmatrix} x_{11} & \cdots & x_{1p} \\ \vdots & \ddots & \vdots \\ x_{n1} & \cdots & x_{np} \end{bmatrix} = \begin{pmatrix} x_i \\ \vdots \\ x_n \end{pmatrix} \text{ where } x_i = (x_{i1}, x_{i2}, \ldots, x_{ip}), i$$

$=1, 2, \ldots, n$, P—dimensional vector

The K-means clustering algorithm partitions n p-dimensional observations of data into k sets S=(S1, S2, . . . , Sk) to minimize a clustering error with respect to a given value k and to satisfy Equation 9.

Equation 9

$$\underset{S}{\arg\min} \sum_{j=1}^{k} \sum_{x \in S_j} \|x - \mu_j\|^2 \qquad \text{Equation 9}$$

$\mu_j = (\mu_{j1}, \ldots, \mu_{jp})$ is a central point of a j-th cluster.

The K-means clustering algorithm is a representative unsupervised learning method and has a feature of performing autonomous learning according to a given criteria because there is no information used to determine a learning performance.

The number of clusters, k, can be set according to various criteria. In the present disclosure, the number "k" is determined using an elbow method. The elbow method measures a decrease in a target function in accordance with a gradual increase in k, and determines that no significant improvement of a model occurs although k further increases when the decrease in the target function is equal to or lower than a predetermined value. The k obtained when the decrease is equal to or lower than the predetermined value is set as the number of clusters.

In one embodiment, the characteristic component extraction unit 140 may extract a characteristic component of a combustible combination that raises or lowers a furnace heat absorption rate from among one or more combustible combinations included in a combustible cluster.

The characteristic component extraction unit 140 determines the kind of coal mixed in mixed coals belonging to a combustible cluster that exhibits a highest furnace heat absorption rate, and extracts the amounts of characteristic components of the coal that is determined to be mixed in the mixed coals. Next, the characteristic component extraction unit 140 determines the kind of coal mixed in mixed coals belonging to a combustible cluster that exhibits a lowest furnace heat absorption rate, and extracts the amounts of characteristic components of the coal that is determined to be mixed in the mixed coals.

The characteristic component extraction unit 140 compares the amounts of the characteristic components of the coal that is mixed in the mixed coals belonging to the combustible cluster that exhibits the highest furnace absorption rate and the amounts of the characteristic components of the coal that is mixed in the mixed coals belonging to the combustible cluster that exhibits the lowest furnace heat absorption rate, and extracts characteristic components that exhibit a difference value equal to or higher than a predetermined reference value.

The characteristic component extraction unit 140 can extract a characteristic component of a combustible combination that raises the furnace heat absorption rate by selecting, among the extracted characteristic components having the difference value equal to or higher than a predetermined reference value, a characteristic component whose amount in the coal that is mixed in the mixed coals included in the combustible cluster that exhibits the highest furnace heat absorption rate is larger than that in the coal mixed in the mixed coals included the combustible cluster that exhibits the lowest furnace heat absorption rate.

The characteristic component extraction unit 140 extracts a characteristic component of the coal that lowers the furnace heat absorption rate by selecting, among the extracted characteristic components having the difference value equal to or higher than the predetermined reference value, a characteristic component whose amount in the coal that is mixed in the mixed coals included in the combustible cluster that exhibits the lowest furnace heat absorption rate is larger than that in the coal mixed in the mixed coals included in the combustible cluster that exhibits the highest furnace heat absorption rate.

In one embodiment, the influence analyzing apparatus may further include a characteristic component selection unit 150 that extracts characteristic components from respective characteristic component groups when a correlation coefficient obtained through correlation analysis of two or more characteristic components included in a characteristic component groups is equal to or higher than a reference value. The reference value may be, for example, 0.7. When the correlation coefficient obtained through correlation analysis of two more characteristic components is equal to or higher than 0.7, it is determined that the characteristic components are highly closely related to each other.

In one embodiment, the influence analyzing apparatus may further include a characteristic component determination unit 160 that selects and determines characteristic components that have a similar influence on the boiler exit temperature, i.e. boiler performance index, from among one or more characteristic components selected through step wise regression. The characteristic component determination unit 160 divides the amount of each characteristic component into three equal parts, and the three parts are then discretized into −1, 0, and 1 in the order from the lowest value part to the highest value part. The boiler exit temperature may be calculated with respect to each of the discretized values −1, 0, and 1.

The characteristic component determination unit 160 performs stepwise regression (regress analysis) by setting the boiler exit temperature as a dependent variable and the three-level discretized characteristic component as an independent variable. When performing the regression analysis, a process of adding or subtracting an independent variable to or from a model is repeatedly performed until the model is not improved any more through the addition or subtraction. The characteristic components included in the model when any improvement of the model does not occur may act as factors that have similar influence on the boiler exit temperature. The choice of independent variables may be performed according to Akaike Information Criterion (AIC).

In one embodiment, the influence analyzing apparatus for analyzing characteristic components of combustibles may further include a relational expression calculation unit 170 that obtains a relational expression of a boiler performance index and one or more characteristic components selected based on a random forest model. The boiler performance index may be a boiler exit temperature, for example. The relational expression calculation unit 170 obtains a relational expression calculating a relationship between the boiler exit temperature and characteristic components that similarly influence the boiler exit temperature using the random forest model.

Parameters that are preferably preliminarily determined to learn a forest model include the number of trees "T" and the number of variables "M" used in split functions. The number "T" and the number "M" can be calculated through repeated K-fold cross-validation.

Figure 2:
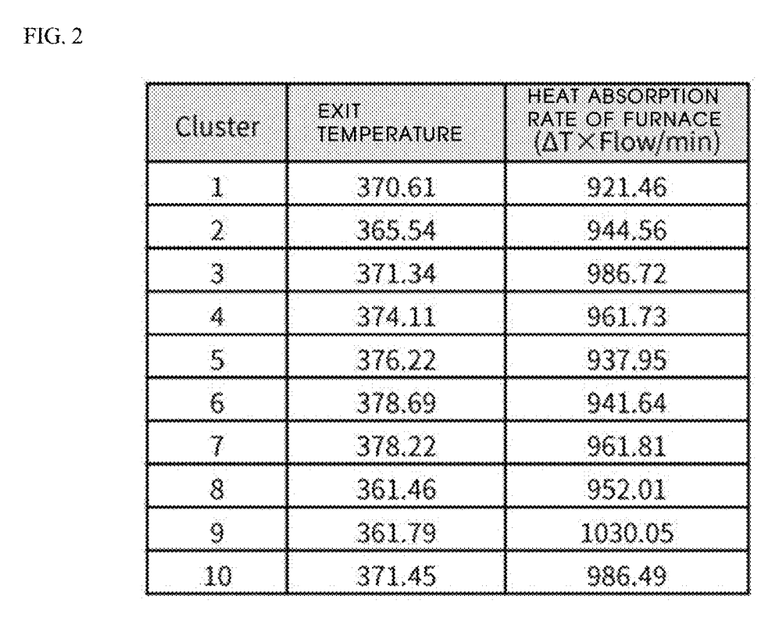
FIG. 2 is a table illustrating a boiler performance index and a furnace heat absorption rate for combustible clusters.

FIG. 2 is a table showing boiler exit temperatures and furnace heat absorption rates of respective clusters. The term "cluster" includes a group of combustibles. Cluster 6 exhibits the highest boiler exit temperature and Cluster 8 exhibits the lowest boiler exit temperature. On the other hand, Cluster 8 exhibits the lowest furnace heat absorption rate and Cluster 9 exhibits the highest furnace heat absorption rate.

Figure 3:
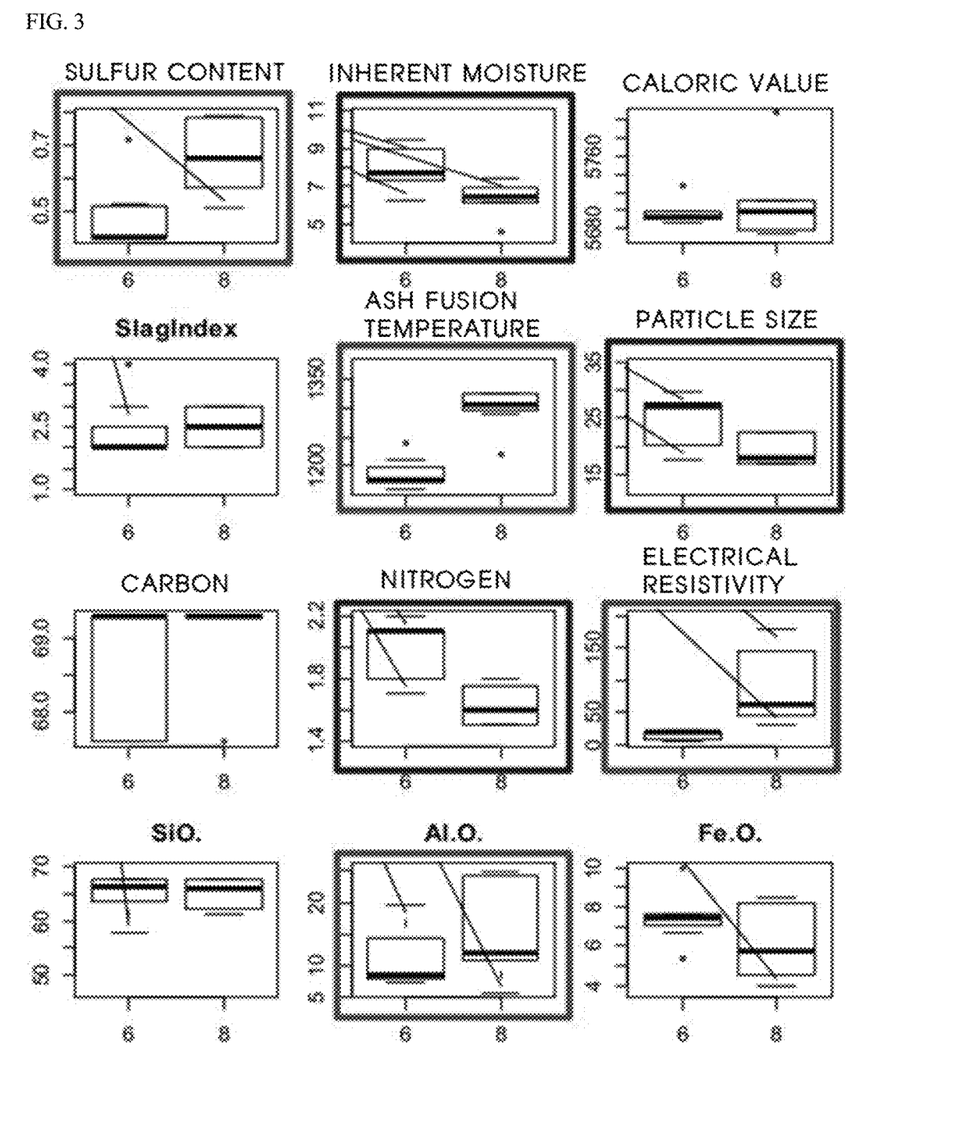
FIG. 3 illustrates the amounts of characteristic components of coal that is mixed in various mixed coals belonging to Cluster 6 shown in FIG. 2 and the amounts of characteristic components of coal that is mixed in various mixed coals belonging to Cluster 8 shown in FIG. 2.

FIG. 3 illustrates the amounts of characteristic components of coal that is determined to be mixed in mixed coals included in Cluster 6 of FIG. 2 and the amounts of characteristic components of coal that is determined to be mixed in mixed coals included in Cluster 8 of FIG. 2.

The characteristic component extraction unit 140 compares the amounts of the characteristic components of coal that is mixed in the mixed coals included in the cluster that exhibits the highest boiler exit temperature and the amounts of the characteristic components of coal that is mixed in the mixed coals included in the cluster that exhibits the lowest boiler exit temperature, and extracts the characteristic components exhibiting a difference value equal to or higher than a predetermined value in the comparison results. With reference to FIG. 3, sulfur content, inherent moisture, ash fusion temperature, particle size, nitrogen content, electrical resistivity, and Al2O3 content are the extracted characteristic components exhibiting a difference value equal to or higher than the predetermined value.

The characteristic component extraction unit 140 selects, among the characteristic components exhibiting the difference value equal to or higher than the predetermined value, a characteristic component whose amount in the coal mixed in the mixed coals included in the cluster that exhibits the highest boiler exit temperature is larger than that in the coal mixed in the coals included in the cluster that exhibits the lowest boiler exit temperature, and determines the selected characteristic component as a characteristic component that raises the boiler exit temperature. With reference to FIG. 3, the characteristic component extraction unit 140 can extract the inherent moisture, the particle size, and the nitrogen content as the characteristic components that raise the boiler exit temperature.

The characteristic component extraction unit 140 selects, among characteristic components exhibiting a difference value equal to or higher than the predetermined value, a characteristic component whose amount contained in the coal mixed in the mixed coals included in the cluster that exhibits the lowest boiler exit temperature is larger than that contained in the coal mixed in the mixed coals included in the cluster that exhibits the highest boiler exit temperature, and determines the selected characteristic component as a characteristic component that lowers the boiler exit temperature. With reference to FIG. 3, sulfur content, ash fusion temperature, electrical resistivity, and Al2O3 can be selected as the characteristic component that lowers the boiler exit temperature.

Figure 4:
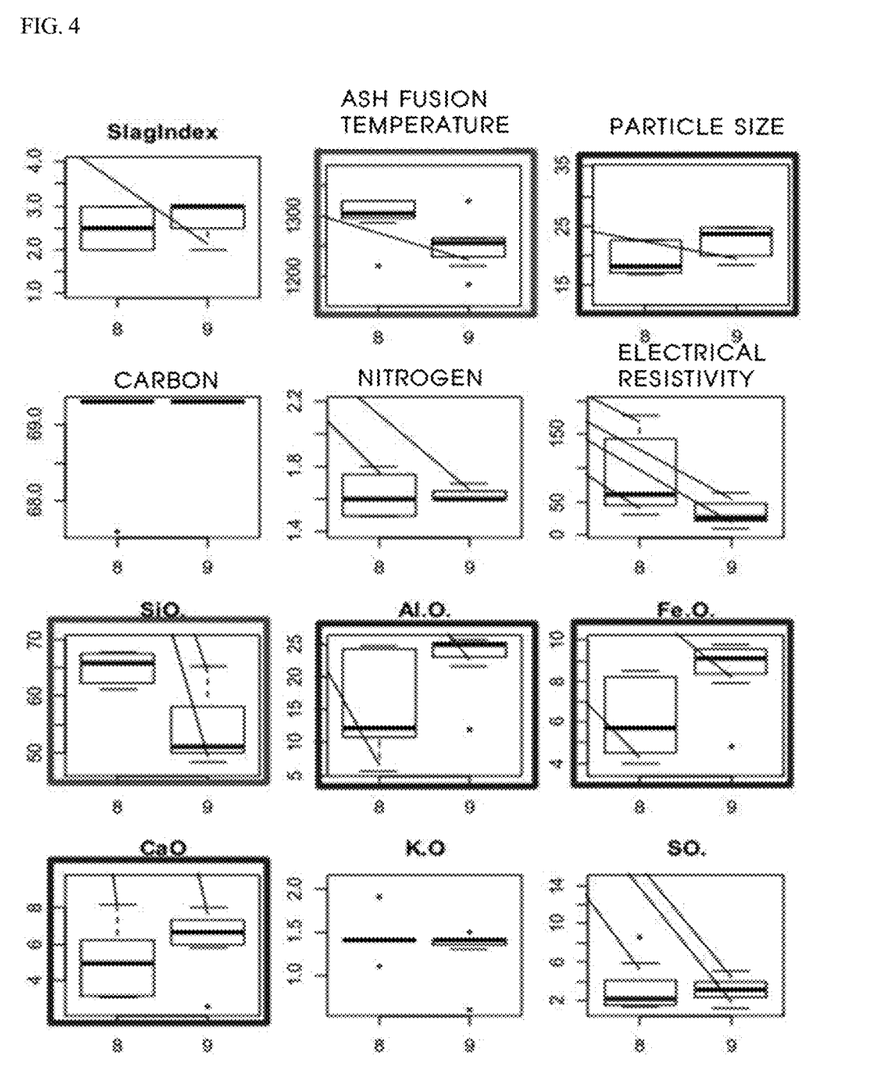
FIG. 4 illustrates the amount of characteristic components of coal that is mixed in various mixed coals belonging to Cluster 8 shown in FIG. 2 and the amount of characteristic components of coal that is mixed in various mixed coals belonging to Cluster 9 shown in FIG. 2.

FIG. 4 shows the amounts of characteristic components contained in the coal that is mixed in the mixed coals included in Cluster 8 of FIG. 2 and the amounts of the characteristic components contained in the coal that is mixed in the mixed coals included in Cluster 9 of FIG. 2.

The characteristic component extraction unit 140 compares the amounts of the characteristic components contained in the coal that is mixed in the mixed coals included in the combustible cluster that exhibits the highest furnace heat absorption rate and the amounts of the characteristic components contained in the coal that is mixed in the mixed coals included in the combustible cluster that exhibits the lowest furnace heat absorption rate, and extracts the characteristic components exhibiting a difference value equal to or higher than a predetermined value in the comparison results. With reference to FIG. 4, the extracted characteristic components exhibiting a difference value equal to or higher than the predetermined value may include an ash fusion temperature, a particle size, SiO2, Al2O3, Fe2O3, and CaO.

The characteristic component extraction unit 140 selects, among the characteristic components exhibiting a difference value equal to or higher than the predetermined value in the comparison results, a characteristic component whose amount in the coal that is mixed in the mixed coals included in the combustible cluster that exhibits the highest furnace absorption rate is larger than that in the coal that is mixed in the mixed coals included in the combustible cluster that exhibits the lowest furnace heat absorption rate, and determines the selected characteristic component as a characteristic component that raises the furnace heat absorption rate. With reference to FIG. 4, the characteristic components that raise the furnace heat absorption rate include a particle size, Al2O3, Fe2O3, and CaO, for example.

The characteristic component extraction unit 140 selects, among the characteristic components exhibiting a difference value equal to or higher than the predetermined value, a characteristic component whose amount in the coal that is mixed in the mixed coals included within the combustible cluster that exhibits the lowest furnace heat absorption rate is larger than that in the coal that is mixed in the mixed coals included within the combustible cluster that exhibits the highest furnace heat absorption rate, and determines the selected characteristic component as a characteristic component that lowers the furnace heat absorption rate. With reference to FIG. 4, the characteristic components that lower the furnace heat absorption rate include an ash fusion point and SiO2.

As described above, the ordinarily skilled in the art of the present disclosure would appreciate that the present disclosure can be embodied in various different forms without departing from the technical spirit or essential features of the present disclosure. Accordingly, the embodiments described above are provided only for illustrative purpose and thus should not be construed as limiting the present disclosure.

Technical features and embodiments of the present disclosure can be implemented in digital electronic circuitry. The structure and structural equivalents described in the present disclosure can be implemented in computer software, firmware, or hardware, or in combinations thereof. Embodiments to realize the technical features disclosed in the present disclosure can be implemented as one or more computer program products, e.g., one or more modules of computer program instructions encoded on a program storage medium for execution by or to control the operation of a processing system.

The computer-readable medium can be a machine-readable storage device, a machine-readable storage substrate, a memory device, a composition of matter affecting a machine-readable propagated signal, or a combination of one or more of them.

Meanwhile, the term "device" or "system" in the specification encompasses all apparatuses, devices, and machines for processing data, including, by way of example, a processor, a computer, and a multi-processor. The processing system can include, in addition to hardware, code that creates an execution environment for a computer program by request, for example, code that constitutes processor firmware, a protocol stack, a database management system, an operating system, or a combination of one or more of them.

A computer program (also known as a program, software, software application, script, or code) can be written in any form of programming language, included compiled or interpreted languages or transcendental and procedural languages, and it can be deployed in any form, including as a standalone program or module, component, subroutine, or other unit suitable for use in a computing environment.

Constituent elements for implementing technical features of the present disclosure included in block diagrams and flowcharts in the accompanying drawings mean logical boundaries of the constituent elements.

However, according one embodiment of software or hardware, the illustrated configurations and functions can be implemented in the form of a standalone software module, a monolithic software structure, a code, a service, or a combination of them, and it can be stored for execution in a computer-readable storage medium in a computer equipped with a processor being capable of executing stored program codes, instructions, etc. Therefore, all of them should be construed to be within the scope of the present disclosure.

Accordingly, although the accompanying drawings and the description thereof describe the technical features of the present disclosure, if a specific arrangement of software to implement these technical features is not clearly stated, the arrangement should not be simply assumed. That is, various embodiments may exist and the embodiments can be partially modified while maintaining the same technical features as the present disclosure. Therefore, the modifications are also considered to be within the scope of the present disclosure.

In some cases, it can be advantageous that the operations are performed in parallel or in a multi-tasking manner. In addition, separation of various system components of the embodiment described above should not be construed to be required in all embodiments. It should be noted that the described program components and systems can be integrated into a single software product or can be provided as multiple software products.

As described above, the present specification is not intended to limit the present disclosure with specific terms. Although the present disclosure has been described in detail with reference to exemplary embodiments, those ordinarily skilled in the art would appreciate that modifications, changes, and alterations thereof are possible without departing from the scope of the present disclosure.

The scope of the present disclosure is defined by the appended claims rather than by the detailed description, and all changes and modifications derived from the definition and scope of the claims and equivalents thereof should be construed to be included within the scope of the present disclosure.

What is claimed is:

1. An influence analyzing apparatus for analyzing influence of combustibles, the combustibles including a mixed coal used in a thermoelectric power plant, the influence analyzing including calculating a degree of influence of characteristic components of the mixed coal on a boiler performance index and a furnace heat absorption rate, the apparatus comprising a computer processing unit (CPU) configured to execute functions of:
   a temperature extractor configured to extract temperatures of respective regions in a feed water and steam system of the thermoelectric power plant in which a combustible combination including one or more coals is combusted;
   a vector extractor configured to extract one or more vectors for each region from the temperatures of the respective regions;
   a cluster generator configured to generate one or more combustible clusters, each cluster including one or more combustible combinations having similar properties, on the basis of the extracted vectors; and
   a characteristic component extractor configured to extract a characteristic component of a combustible combination that increases or decreases the boiler performance index from the one or more combustible combinations included in the one or more combustible clusters.

2. The apparatus according to claim 1, wherein the temperature extractor is configured to extract temperatures of at least one of a feed water heater, an economizer, a furnace, a super heater, and a reheater in each region of the feed water and steam system.

3. The apparatus according to claim 1, wherein the temperature extractor is configured to extract temperatures for each region at a predetermined time interval.

4. The apparatus according to claim 1, wherein the vector extractor is configured to extract the one or more vectors by performing functional principal component analysis with respect to the extracted temperatures of the respective regions.

5. The apparatus according to claim 1, wherein the vector extractor is configured to calculate a smoothing function based on a basis function, and calculate, for each combustible combination, an average of the temperatures of the respective regions of the feed water and steam system and a covariance at two different time points based on the calculated smoothing function.

6. The apparatus according to claim 5, wherein the vector extractor is configured to calculate an eigen function and eigenvalues using the calculated covariance, and extract the one or more vectors for each region with respect to each combustible combination on the basis of the calculated eigen function, the calculated smoothing function, and the calculated average temperature of the temperatures of the respective regions of the feed water and steam system with respect to each of the one or more combustible combinations.

7. The apparatus according to claim 6, wherein the vector extractor is configured to extract the eigen function by minimizing a variance of the calculated eigenvalues.

8. The apparatus according to claim 1, wherein the cluster generator is configured to generate the one or more combustible clusters based on cluster analysis.

9. The apparatus according to claim 1, wherein the boiler performance index includes at least one of an exit temperature of a boiler and the furnace heat absorption rate.

10. The apparatus according to claim 1, wherein the CPU is further configured to execute a function of a characteristic component selector configured to select one or more characteristic components from characteristic component groups when a correlation coefficient obtained through correlation analysis of two or more characteristic components included in the characteristic component group is greater than or equal to a reference value.

11. The apparatus according to claim 10, wherein the CPU is further configured to execute a function of a characteristic component determiner configured to determine, by performing stepwise regression, a characteristic component influencing the boiler performance index from among the selected one or more characteristic components.

12. The apparatus according to claim 10, wherein the CPU is further configured to execute a function of a relational expression calculator configured to calculate, using a random forest algorithm, a relational expression to determine a relationship between the selected one or more characteristic components and the boiler performance index.

* * * * *